US012184680B2

(12) United States Patent
Chiang et al.

(10) Patent No.: US 12,184,680 B2
(45) Date of Patent: Dec. 31, 2024

(54) SESSION SLICING OF MIRRORED PACKETS

(71) Applicant: Arista Networks, Inc., Santa Clara, CA (US)

(72) Inventors: Kenneth Hsinchao Chiang, Fremont, CA (US); Sandip Shah, Fremont, CA (US); Michael T. Stolarchuk, Ypsilanti, MI (US)

(73) Assignee: Arista Networks, Inc., Santa Clara, CA (US)

( * ) Notice: Subject to any disclaimer, the term of this patent is extended or adjusted under 35 U.S.C. 154(b) by 338 days.

(21) Appl. No.: 17/644,410

(22) Filed: Dec. 15, 2021

(65) Prior Publication Data
US 2023/0188550 A1   Jun. 15, 2023

(51) Int. Cl.
*H04L 9/40* (2022.01)
*H04L 47/10* (2022.01)

(52) U.S. Cl.
CPC .......... *H04L 63/1425* (2013.01); *H04L 47/10* (2013.01); *H04L 63/1416* (2013.01); *H04L 63/1466* (2013.01); *H04L 63/166* (2013.01); *H04L 63/20* (2013.01)

(58) Field of Classification Search
CPC ......... H04L 43/04; H04L 43/12; H04L 47/10; H04L 63/1416; H04L 63/1425; H04L 63/1466; H04L 63/166; H04L 63/20
See application file for complete search history.

(56) References Cited

U.S. PATENT DOCUMENTS

| 7,133,365 | B2* | 11/2006 | Klinker | H04L 47/20 370/252 |
| 7,606,160 | B2* | 10/2009 | Klinker | H04L 47/20 370/252 |
| 7,882,257 | B2* | 2/2011 | Kerr | H04L 9/40 709/230 |
| 8,681,794 | B2* | 3/2014 | Hill | H04L 49/355 370/392 |
| 8,724,496 | B2* | 5/2014 | Tardo | H04L 63/0245 370/252 |
| 9,525,696 | B2* | 12/2016 | Kapoor | G06F 16/2358 |
| 9,800,608 | B2* | 10/2017 | Korsunsky | G06F 21/55 |
| 9,813,323 | B2* | 11/2017 | Emmadi | H04L 41/0893 |

(Continued)

OTHER PUBLICATIONS

International Search Report and Written Opinion mailed Mar. 23, 2023, Application No. PCT/US2022/081305, 15 pages.

(Continued)

*Primary Examiner* — Alpus Hsu
(74) *Attorney, Agent, or Firm* — Fountainhead Law Group, PC

(57) ABSTRACT

Data taps are provided in a production network to mirror traffic flow through the network. Feeds from the data taps are provided to a monitoring fabric comprising a network of service nodes. A service node receives mirrored traffic and identifies packets in the mirrored traffic for further processing, for example to be forwarded to one or more monitoring/security tools. The packets are identified based on the contents of the packets. For example, packets at the beginning of a TCP session and at the end of the TCP session can be identified based on the TCP flags in the packets. The service node can cause these packets to be sent to one or more monitoring/security tools.

20 Claims, 10 Drawing Sheets

(56) References Cited

U.S. PATENT DOCUMENTS

| | | | |
|---|---|---|---|
| 2002/0085574 A1* | 7/2002 | Kerr | H04L 47/621 |
| | | | 370/429 |
| 2012/0210416 A1 | 8/2012 | Mihelich et al. | |
| 2018/0091387 A1* | 3/2018 | Levi | H04L 43/028 |
| 2018/0091388 A1* | 3/2018 | Levy | H04L 43/12 |
| 2019/0116111 A1 | 4/2019 | Izard et al. | |
| 2020/0287967 A1* | 9/2020 | Gafni | H04L 12/4633 |

OTHER PUBLICATIONS

Kim Hyojoon, et al., "Experience-driven research on programmable networks", ACM SIGCOMM Computer Communication Review, vol. 51 Issue 1, 8 pages (201-03-12).

"White Paper 1 © 2014 Big Switch Networks Big Tap Monitoring Fabric: Tap Sharing SDN Enabled, Ultra Low Cost Network Visibility 2 White Paper; Big Tap Monitoring Fabric: Tap Sharing © 2014 Big Switch Networks Table of Contents" retrieved from the internet: https://go.bigswitch.com/rs/974-WXR-56 1/images/MF%20Tap%20Sharing%20WP-V2-EN%20J AN31%202014 , 8 pages (Jan. 14, 2021).

* cited by examiner

SESSION SLICING OF MIRRORED PACKETS

BACKGROUND

Network security tools monitor network traffic to identify security threats in an operational (customer) network (production fabric). A typical configuration includes placing data taps on the links between communicating devices (e.g., network tap devices) or in the switches themselves (e.g., switched-port analyzer (SPAN) ports) to mirror the production traffic. The data taps feed the mirrored traffic to the security tools.

The underlying hardware used to implement the security tool infrastructure (monitoring fabric) is typically one or more generations behind the hardware infrastructure of the production fabric. Accordingly, bandwidth performance in monitoring is typically lower than in the production fabric; security tools generally cannot keep up with the line-rates of the communication links in the production fabric.

Current solutions to compensate for the bandwidth disparity between production and monitoring fabric includes packet slicing, where only a portion of the packet is captured; e.g., the first n bytes of a packet. Another solution is packet sampling; e.g., capturing every $n^{th}$ packet, capturing some number of packets periodically, and so on. Still another approach is rate-limiting the mirrored traffic. Rate-limiting refers to dropping frames when the frame rate reaches some threshold.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

The present disclosure is directed to monitoring communication sessions in a production fabric between two clients. Data taps are provided in the production network to mirror traffic throughout the network. Feeds from the data taps are provided to a monitoring fabric comprising a network of service nodes. Each service node receives one or more feeds from the data taps.

Each service node can identify certain packets from the mirrored traffic for forwarding to one or more monitoring/security tools. In some embodiments, for example, the packets can be at the beginning of a session and at the end of a session. In some embodiments, for example, the SYN and ACK bits in TCP packets can be used to identify the beginning of a session and the FIN bits can be used to identify the end of a session; for example, using TCAM rules. The service node can direct the first n packets of a session to one or more monitoring/security tools.

Remaining packets in the mirrored traffic can be dropped or directed to a packet recorder or other packet capture utility. In some embodiments, where the monitoring fabric employs VLANs or VxLANs, packets of interest (e.g., at the beginning and at the end of a session) can be sent to one VLAN and remaining packets can be sent to another VLAN.

The present disclosure allows important packets, e.g., beginning of a session, end of a session, to be analyzed by a security tool while at the same time avoiding inundating the security tool with unimportant packets. Sending only important packets to the security tool ensures that all sessions carried in the mirrored traffic can be monitored and analyzed. Sending remaining packets to other tools, (e.g., a packet recorder, traffic analyzer, etc.) allows for the mirrored traffic to be further analyzed or otherwise processed.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
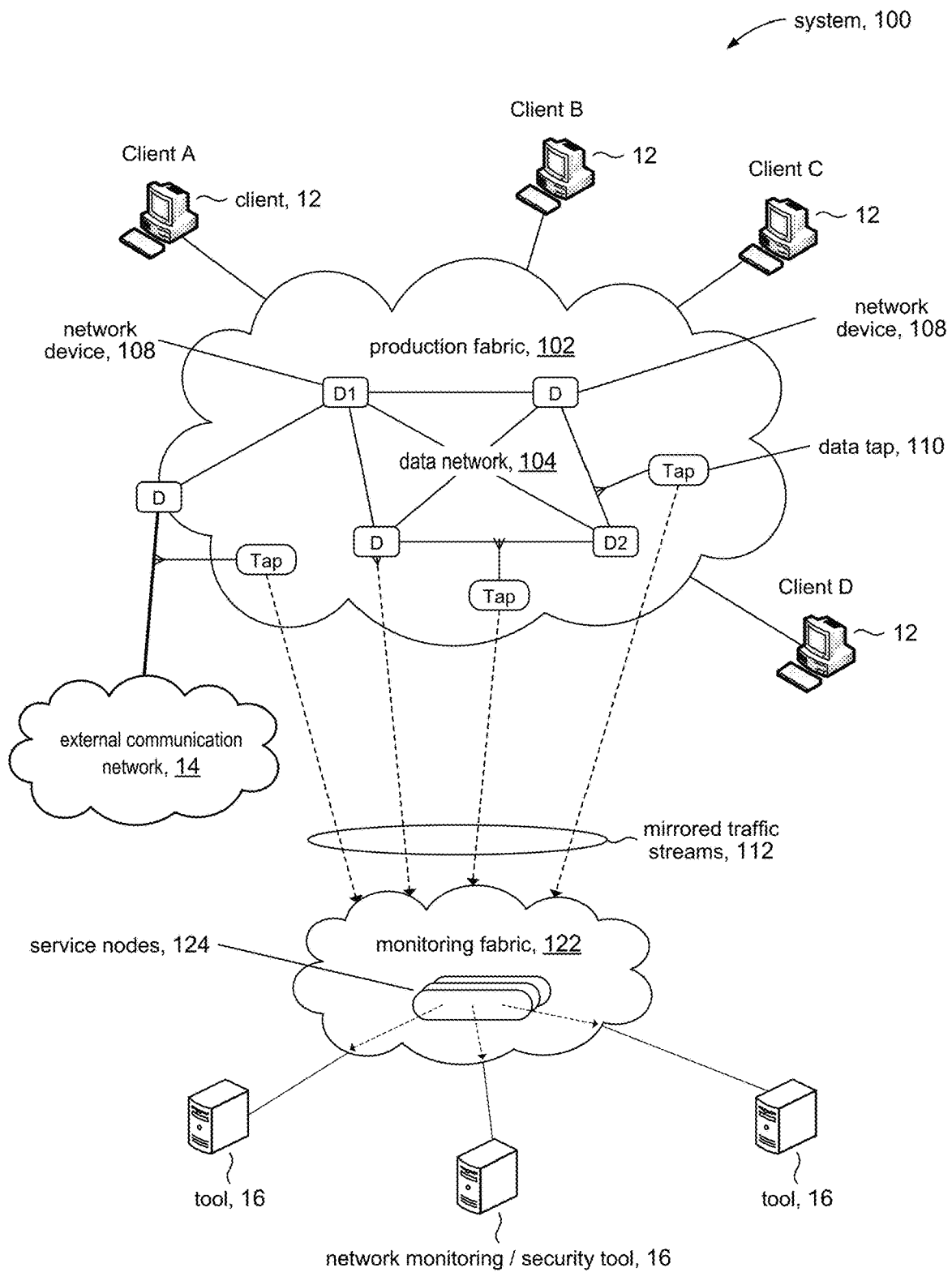
FIG. 1 is a high level diagram of a deployment in accordance with the present disclosure.

FIG. 1 shows an illustrative system 100 in accordance with the present disclosure. System 100 includes a production fabric 102 that represents an organization or enterprise, such as, business, educational institution, governmental entity, healthcare facility, a data center, and so on. System 100 further includes a monitoring fabric 122 (also referred to as a network packet broker, NPB) to monitor data flows in production network 102.

Production fabric 102 includes data network 104, which in turn comprises an interconnection of network devices 108. Network devices 108 can include routing and switching devices such as top-of-rack ("ToR") switches, aggregation switches, gateways, ingress and/or egress switches, provider edge devices, and the like. Data network 104 provides communication among clients 12, such as users on computing devices (e.g., desktop computers, laptops, mobile devices, etc.) and servers (e.g., database servers, web services, etc.). Data network 104 can connect to an external network 14, such as a public switched network, for communication outside of the organization or enterprise.

In accordance with the present disclosure, production network 102 includes data taps 110 to monitor traffic among network devices 108. The traffic between any two network devices (e.g., D1, D2) comprises traffic between any two clients whose data path includes those two network devices. Merely to illustrate this point, suppose network devices D1, D2 are on the data path between Client A and Client C, the data path between Client B and Client C, and the data path between Client B and Client D. The traffic between network devices D1, D2 will include the traffic between A and C, the traffic between B and C, and the traffic between B and D. Moreover, the traffic between network devices D1, D2 may comprise an interleaving of packets that constitute the traffic among Clients A-D.

Data taps 110 mirror (copy) the traffic flow in data network 104 and provide the mirrored traffic as mirrored traffic streams 112 to monitoring fabric 122. Data taps 110 include network tap devices, switched-port analyzer (SPAN) ports, and the like.

Monitoring fabric 122 comprises one or more service nodes 124 to receive and filter or otherwise process mirrored traffic streams 112 in accordance with the present disclosure. Service nodes 124 can feed the mirrored traffic streams, to various network monitoring/security tools 16 to monitor network performance, provide visibility, detect and respond to threats, identify bad actors, and so on. The service nodes can deliver data streams to the tool in whole (e.g., a packet recorder) or in segments or slices (e.g., packet analyzer). Network monitoring tools 16 include but are not limited to packet analyzers, packet recorders, bandwidth monitors, and the like.

Figure 2:
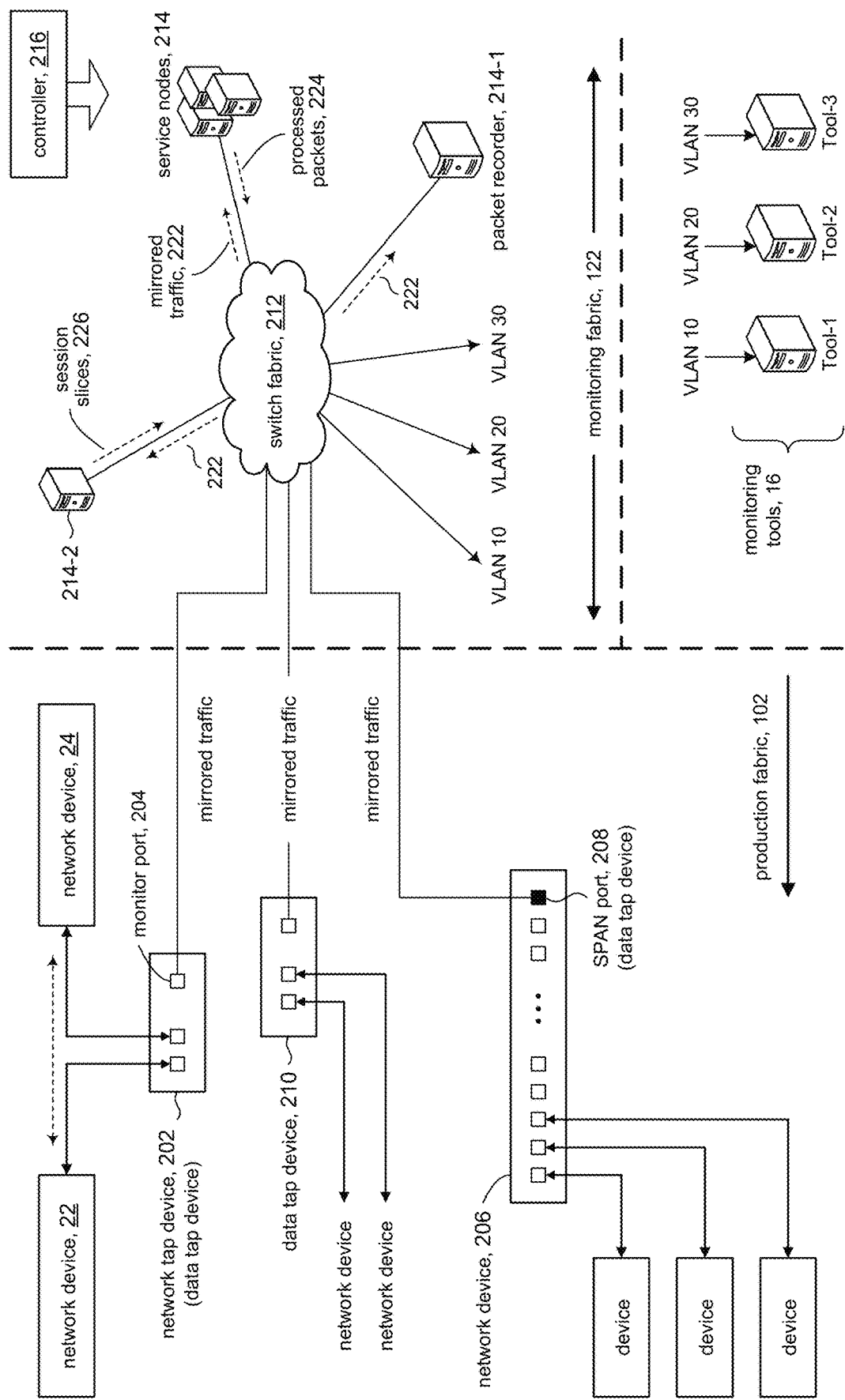
FIG. 2 shows details in a production fabric and a monitoring fabric in accordance with some embodiments.

FIG. 2 shows additional details of system 100 in accordance with some embodiments. Consider the data tap devices shown in production fabric 102 in FIG. 1, for example. In some embodiments, a data tap device can be a network tap device. A network tap device creates a copy (mirrors) traffic flow between two network devices. FIG. 2, for example, shows network tap device 202 connected between two network devices 22, 24. The network tap device can monitor/mirror traffic flow between the network devices without impeding the flow. The network tap device includes a monitor port 204 out of which the mirrored traffic can be transmitted.

In the context of the present disclosure, a data tap device can be a special port on a network device (e.g., switch, router, etc.) that is configured to provide port mirroring; e.g., a SPAN port. FIG. 2, for example, shows network device 206 having several ports to which devices (e.g., hosts, other network devices, etc.) are connected. Network device 206 includes a SPAN port 208. Network device 206 can be configured to send a copy of traffic flowing across one or more regular ports in the device to SPAN port 208. It will be appreciated that the production fabric can deploy any suitable number of data tap devices. The more data tap devices deployed in the production fabric, the more complete a view of traffic flow in the production network is possible.

As FIG. 2 illustrates, in some embodiments monitoring fabric 122 can include switching fabric 212 and service nodes 214 connected to the switching fabric. Switching fabric 212 can include a configuration of switches to which the data taps in production fabric 102 are connected. The switching fabric can forward the mirrored traffic to service nodes 214 for processing.

Service nodes are known. Briefly, a service node receives mirrored traffic 222 from one of the switches in the switching fabric as a stream of packets. The service node can perform user-specified services on the received packets. Controller 216 allows a user (e.g., network manager) to configure the service nodes to perform various services on the mirrored traffic. Services include modifying the received packets, for example, by adding headers and trailers to packets, truncating packets to a specified length, decapsulating packets by stripping off specified encapsulations, searching for specific regular expressions in packets, masking out bytes matching specific regular expressions, etc. In accordance with the present disclosure, a service node 214-2 can be configured to process a stream of mirrored traffic to generate session slices 226.

The service nodes can transmit processed packets 224, 226 back to the switching fabric. In some embodiments, the packets can be "hairpinned" back to the switching fabric; in other words, the packets can be transmitted back over the same interface on which the packets were received. In other embodiments, the packets can be sent back to the switching fabric on an interface different from the interface on which the packets were received.

The switching fabric can forward the processed traffic to monitoring tools 16. In some embodiments, the monitoring tools can be deployed in a virtual local area network (VLAN). In some cases, for example, a monitoring tool can be on its own VLAN. In other cases, two or more monitoring tools can share the same VLAN. Switches in the switching fabric can perform VLAN tag handling (e.g., adding new VLAN tags, changing VLAN IDs, removing VLAN tags) to forward the processed traffic to one or more monitoring tools according to the VLANs on which the target monitoring tools are connected. Monitoring tools 16 will receive processed traffic on their respective VLANs.

Controller 216 allows a user to configure the switches in the switching fabric 212 to forward the mirrored traffic in any suitable configuration. For example, some service nodes (e.g., 214-1) can be configured as packet recorders, packet capture appliances, etc. Switches in the switching fabric can be configured to forward mirrored traffic to both a service node for processing and packet recorder 214-1 to store the mirrored traffic for subsequent review or playback. Controller 216 allows the user to configure the switches to forward processed traffic from the service nodes to appropriate monitoring tools.

Figure 3:
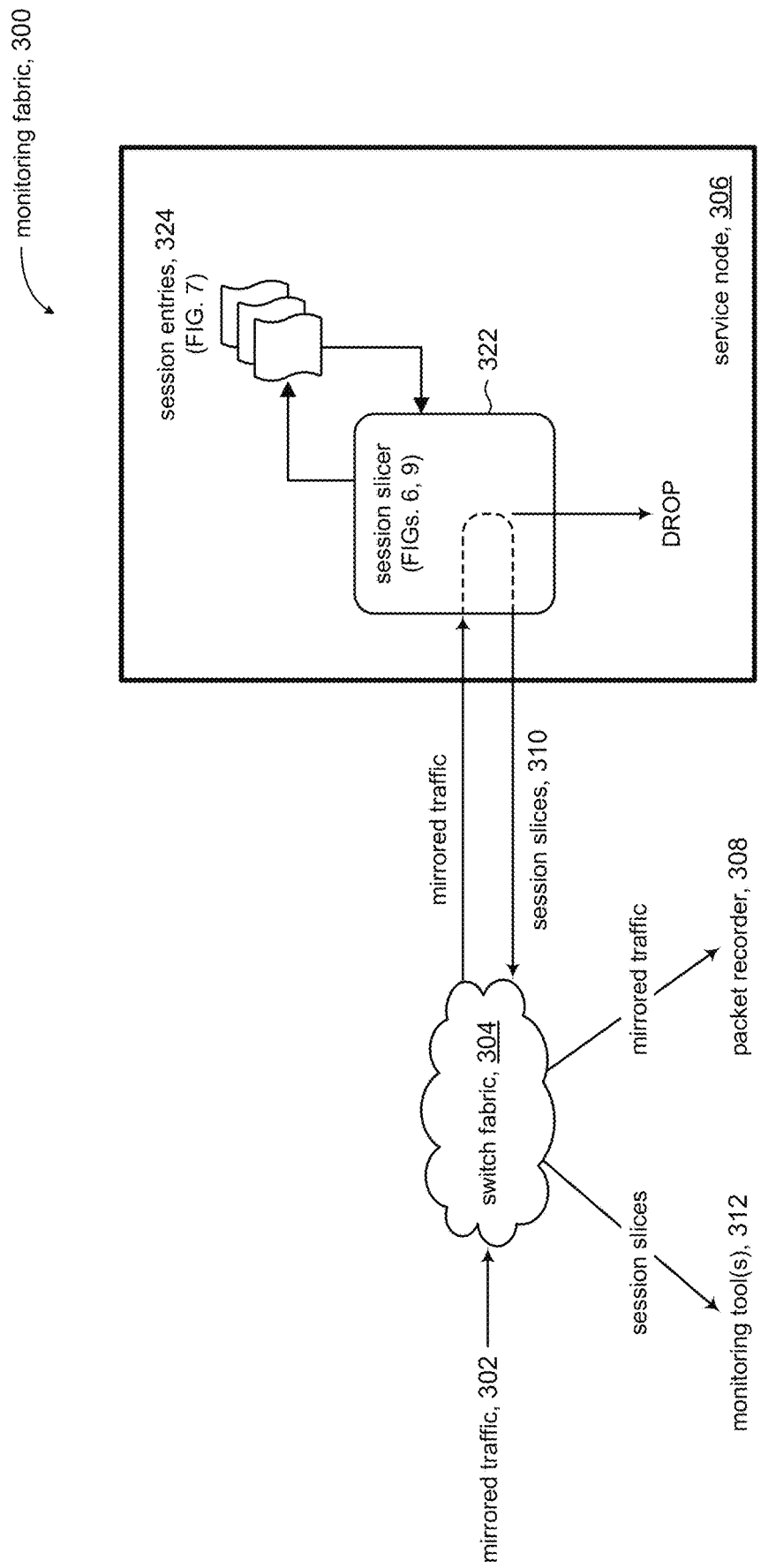
FIG. 3 is a high level representation of a service node in accordance with some embodiments.

Referring to FIG. 3, the discussion will now turn to details of a service node in accordance with the present disclosure. FIG. 3 shows a portion of a monitoring fabric 300, where mirrored traffic 302 (e.g., generated in a production fabric) is provided to switch fabric 304. Switch fabric 304 forwards the mirrored traffic to service node 306. The switch fabric can also forward the mirrored traffic to a packet recorder 308, for example for subsequent playback. Service node 306 can pass (e.g., hairpin) portions of the mirrored traffic, referred to as session slices 310, back to the switch fabric. The switch fabric can then forward the session slices to one or more monitoring tools 312.

In accordance with the present disclosure, service node 306 can include a session slicer 322 and a data table of session entries 324. Session slicer 322 can identify sessions in the mirrored traffic. Session entries 324 provide state information for the sessions. The session slicer can identify sessions within the mirrored traffic using session entries 324. Portions of identified sessions (session slices) can be passed back into the switch fabric, and other portions can be dropped. These aspects of the present disclosure are discussed below.

Figure 4:
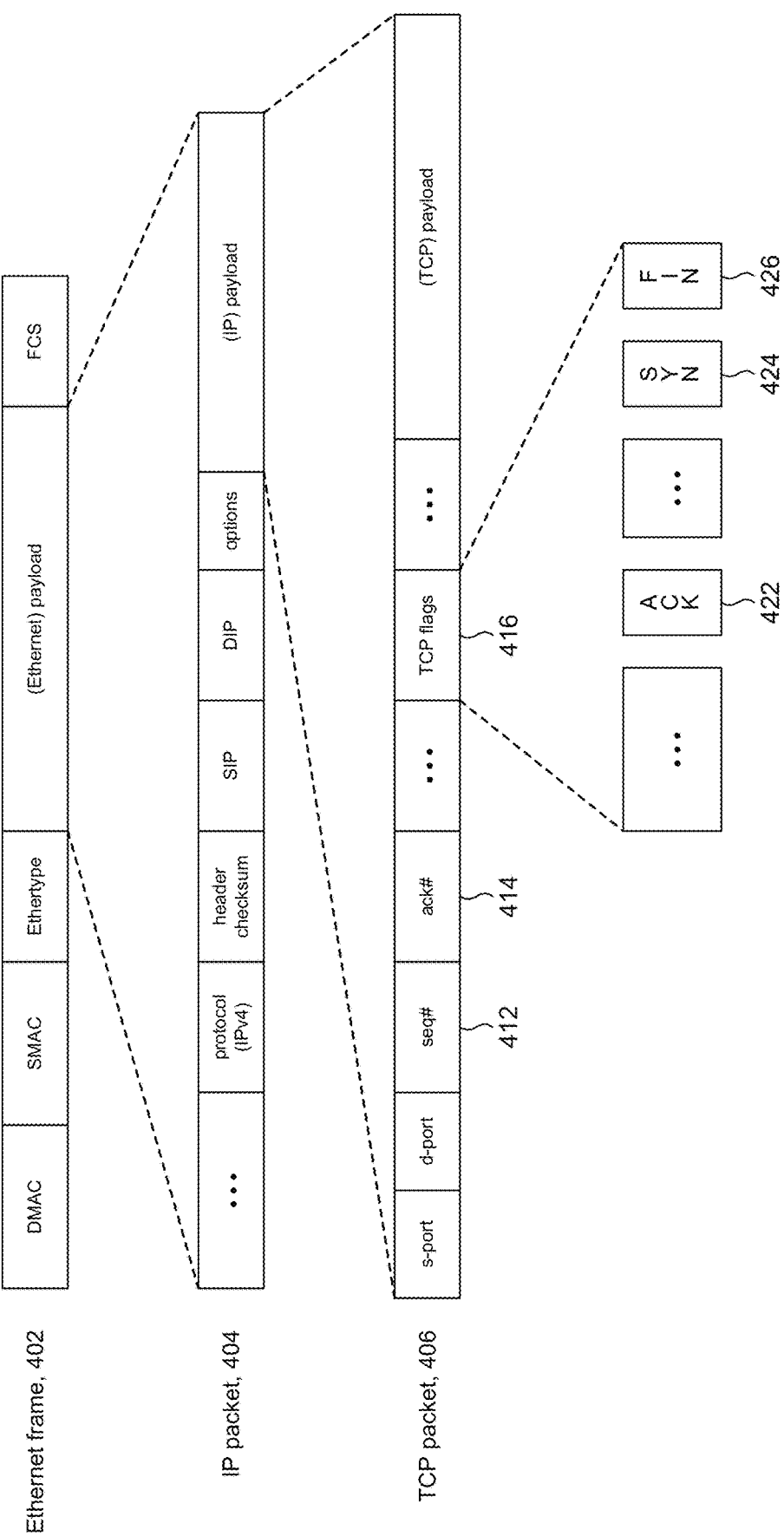
FIG. 4 shows the general format of a TCP packet encapsulated in an Ethernet frame.

Merely for discussion purposes, a Transmission Control Protocol (TCP) session (connection) will be used as an example of a session. TCP is well known and understood. Briefly, and with reference to FIG. 4, in some embodiments, the received packet can be an Ethernet frame 402. Contained within the Ethernet frame is the payload portion, among other data fields. The Ethernet payload, in turn, can include an Internet Protocol (IP) packet 404. Contained within the IP payload is a TCP packet 406. The TCP packet includes Seq #data field 412, Ack #data field 414, TCP flags 416, and other data fields; user information is contained in the TCP payload.

Establishing and closing a TCP session are well known and understood operations. Briefly, and with reference to FIG. 5, we show an illustrative example of a TCP session between Client A and Client B. The example highlights packets that establish a session and packets that terminate (close) the session. The traffic between Client A and Client B may be captured, for example, by tapping the data flow between two network devices (e.g., 22, 24, FIG. 2) that are on a data path between Client A and Client B using a data tap (e.g., 202).

Figure 5:
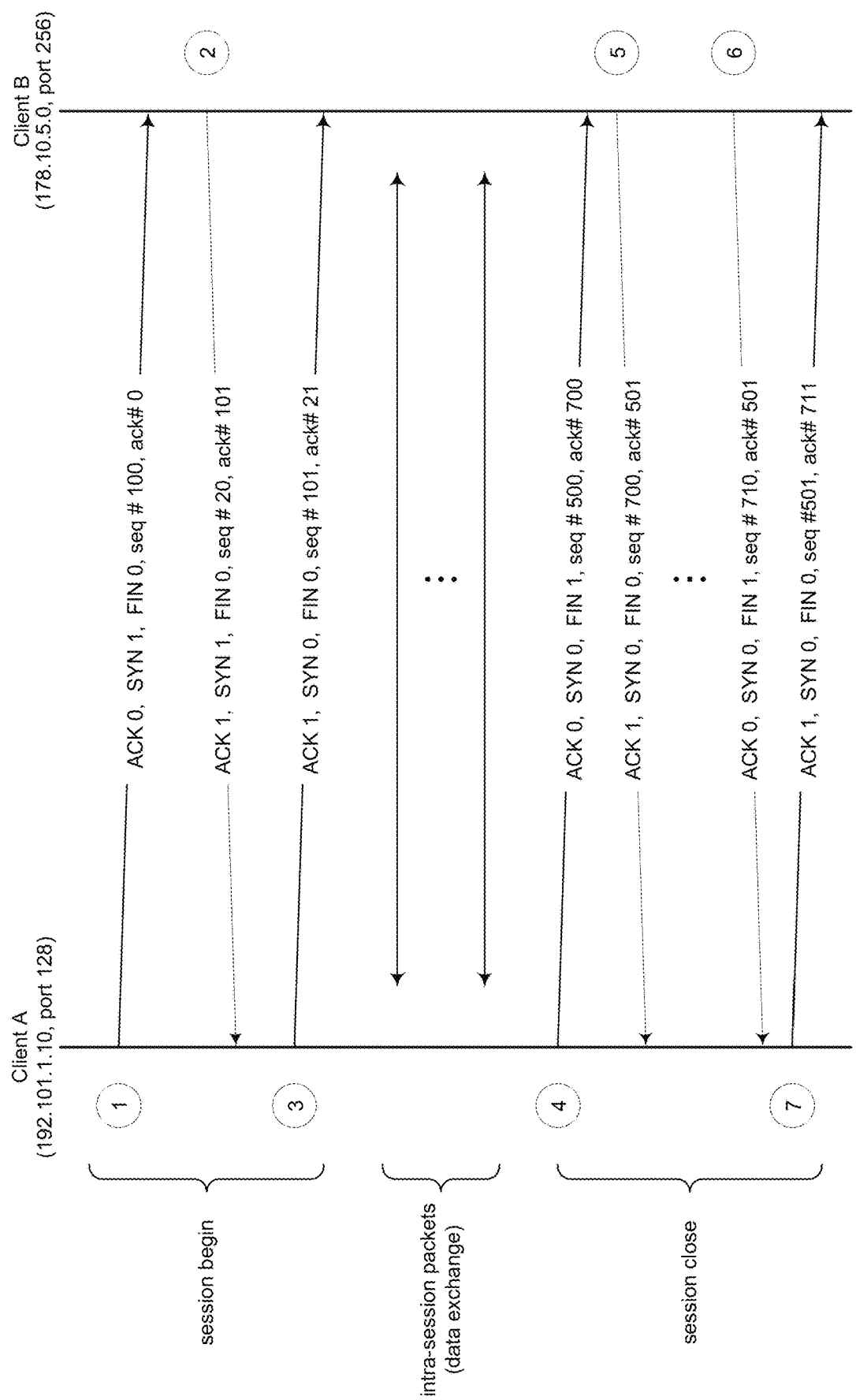
FIG. 5 illustrates the general sequence for a TCP session.

A TCP session can be established between Client A and Client B via a sequence sometimes referred to as the "TCP three-way handshake." FIG. 5 shows only the TCP flags (e.g., 416, FIG. 4) and sequence number components of the data packets transmitted between Client A and Client B. The sequence is referenced with the use of time indices represented in the figure by circled numbers.

At time index 1, for example, Client A sends a TCP start-of-session packet to Client B with the SYN flag set to '1' (SYN←1) and the ACK flag set to '0' (ACK←0). The value contained in the sequence number field (412, FIG. 4) in the packet from Client A is the initial sequence number for the stream of bytes from Client A, and is shown in FIG. 5 as 100. It is understood that Client A can use any starting number (e.g., randomly chosen). The acknowledgement number field (414, FIG. 4) is not used at this time, and can be set to zero, as shown in FIG. 5.

At time index 2, B returns a TCP packet in which both the SYN and ACK flags are set to '1'. The value contained in the acknowledgement number field in the packet from Client B is the next sequence number that Client B expects from Client A, namely 101. With respect to the sequence number field, Client B can randomly select a starting number as its initial sequence number, which for discussion purposes is shown in FIG. 5 as 20.

At time index 3, Client A sends a TCP packet in which ACK is set to '1' and SYN flag is set to '0'. Client A acknowledges B's sequence number with the ACK flag set and the appropriate value in the acknowledgement number field, namely 21 in our example. The sequence number field is incremented to the next value that Client B expects from Client A.

At this point, a TCP session between Client A and Client B can be deemed to be established; A and B can begin to exchange data. The sequence and acknowledgement number fields in the packets from A to B and from B to A will increment depending on the amount of data transmitted in each direction. When the exchange of data between A and B has concluded, the session can be terminated (closed, etc.). FIG. 5 shows a sequence to close the session, referred to as a 4-way handshake.

At time index 4, one side sends a TCP end-of-session packet to initiate the session close sequence. As shown in FIG. 5, suppose Client A sends an end-of-session packet to Client B with FIN←1. The sequence and acknowledgement number fields in the packet from Client A reflect the amount of data (e.g., number of bytes) transmitted in each direction during the session; the values in the packet from Client A shown in FIG. 5 are merely illustrative for discussion purposes.

At time index 5, Client B can respond by ack'ing Client A with ACK←1. As shown in FIG. 5, Client B need not immediately send its FIN packet. The figure shows that Client B has some additional bytes data to send to Client A, after which time at time index 6 Client B can send FIN←1 to Client A. At time index 7, Client A can respond to Client B with ACK←1, after which the session can be deemed to be terminated or closed.

Packets at the beginning of a session may contain useful information for security monitoring. Accordingly, aspects of the present disclosure include monitoring of the mirrored traffic for the occurrence of sessions between clients (e.g., Client A, Client B). The beginning portions of a detected session can be forwarded to one or more monitoring tools for subsequent security evaluation. Similarly, the end portions of the detected session can be sent to the monitoring tool(s). These portions of a session can be referred to herein as "session slices." Session slices can comprise packets sent from one client to the other (e.g., packets from Client A to Client B or packets from Client B to Client A). Session slices can refer to packets sent in both directions. Packets between the beginning slice and the end slice of a session (intra-session packets) can be dropped or otherwise not sent to the monitoring tool(s). Providing the tools with the beginning and end slices of the detected sessions allows the tools to perform complete analyses of the sessions. Omitting the intra-session packets from the tools eliminates the need for the tools to filter out (detect and drop) those packets, allowing the tools to keep up with the higher line rate packet streams in the production fabric.

Figure 6:
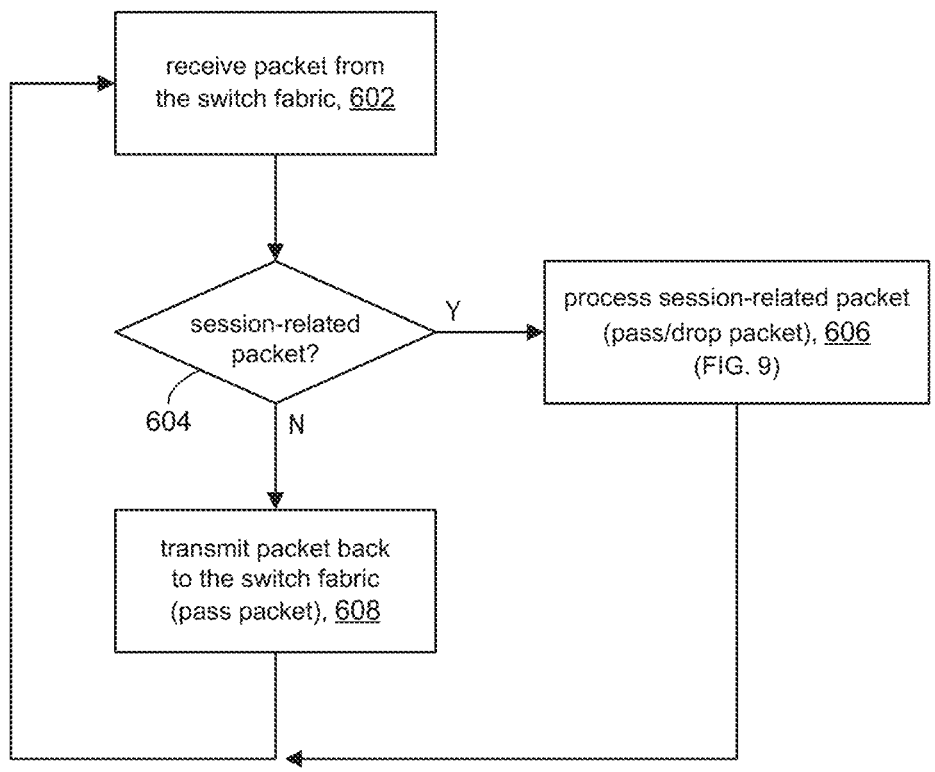
FIG. 6 is a high level flow of operations in a service node in accordance with the present disclosure.

Referring to FIG. 6, the discussion will now turn to a high level description of processing in a service node (e.g., 124, 214) for processing a stream of mirrored traffic in accordance with the present disclosure. In some embodiments, for example, the service node can include computer executable program code, which when executed by a processor (e.g., 1102, FIG. 11), can cause the service node to perform processing in accordance with FIG. 6.

At operation 602, the service node can receive mirrored traffic from a switch fabric (e.g., 312, FIG. 3). As explained above, the mirrored traffic is a copy of the traffic flow between two network devices in the production fabric. The service node can process the stream of packets in the mirrored traffic, one (received) packet at a time. As noted above, the mirrored traffic comprises packets from data streams between any two clients whose data path includes the two network devices. The different data streams are typically interleaved or otherwise interspersed with each other. Accordingly, a packet processed by the service node can be from a data stream that is different from that of the next packet processed by the service node.

At decision point 604, the service node can determine if the received packet is a session-related packet or not. In accordance with some embodiments, a session-related packet can be a packet in an already established session. Recall from FIG. 3, session entries 324 can provide state information for established sessions. Accordingly, if the received packet is associated with a session entry, then the received packet can be deemed to be session-related. As will be discussed below in connection with FIG. 7, in some embodiments, the service node can use the source and destination IP addresses and TCP ports in the received packet to look for a session entry in the session table. If a session entry is found, then the received packet can be deemed to be a session-related packet and processing can proceed to operation 606.

In some embodiments, the packets of the 3-way handshake (FIG. 5) that set up a session can also be regarded as session-related packets in that they relate to establishing a session despite there not being a session. In the case of a start-of-session packet, the packet will not be associated with a session entry because, by definition, the session has not yet been established and so there is no session entry. Nonetheless, a start-of-session packet can still be regarded as a session-related packet. Accordingly, in some embodiments, a start-of-session packet can be viewed by the service node as being a session-related packet. If the received packet is a start-of-session packet (e.g., its TCP flags are ACK==0, SYN==1, FIN==0, FIG. 5), then the received packet can be deemed to be a session-related packet and processing can proceed to operation 606. Otherwise, the received packet can be deemed to be not related to a session and processing can proceed to operation 608.

Figure 9:
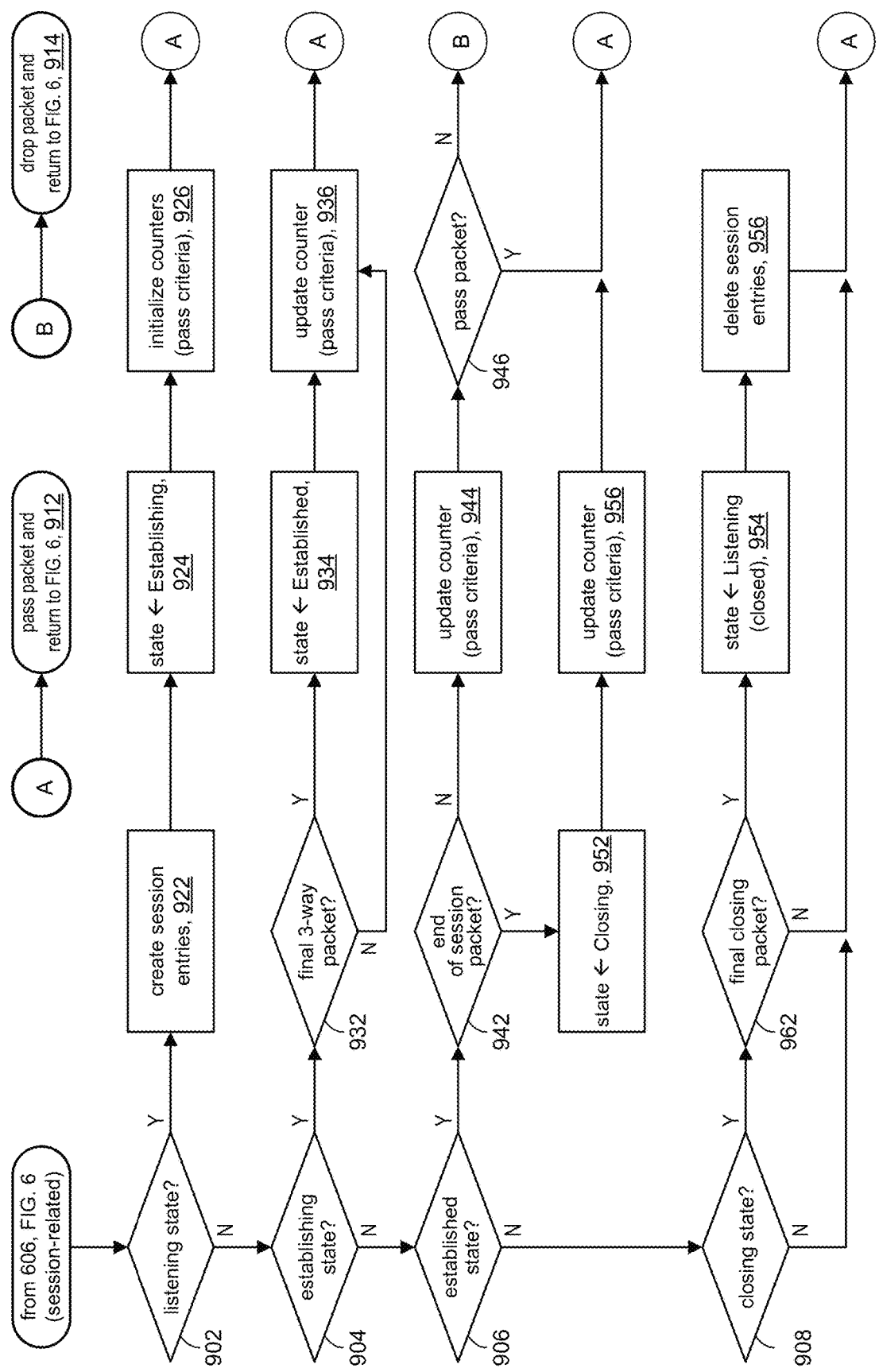
FIG. 9 is a high level flow of operations in a service node to process a TCP session in accordance with some embodiments.

At operation 606, because the received packet is deemed to be a session-related packet, the service node can process the session-related packet, details of which are described in FIG. 9. On completion of processing in accordance with FIG. 9, processing can return to operation 602 to process the next received packet in the stream of mirrored traffic.

At operation 608, because the received packet is not deemed to be a session-related packet, the service node can pass the packet back to the switch fabric. Depending on how the switch fabric is configured, the packet may be forwarded to a monitoring tool. Processing can return to operation 602 to process the next received packet in the stream of mirrored traffic.

The discussion will now turn to a description of processing session-related packets in accordance with the present disclosure. Recall that in some embodiments, a packet can be deemed to be a session-related packet because it is a start-of-session packet (despite not being associated with a session entry) or the packet can be deemed to be a session-related packet because it is associated with a session entry.

Figure 7:
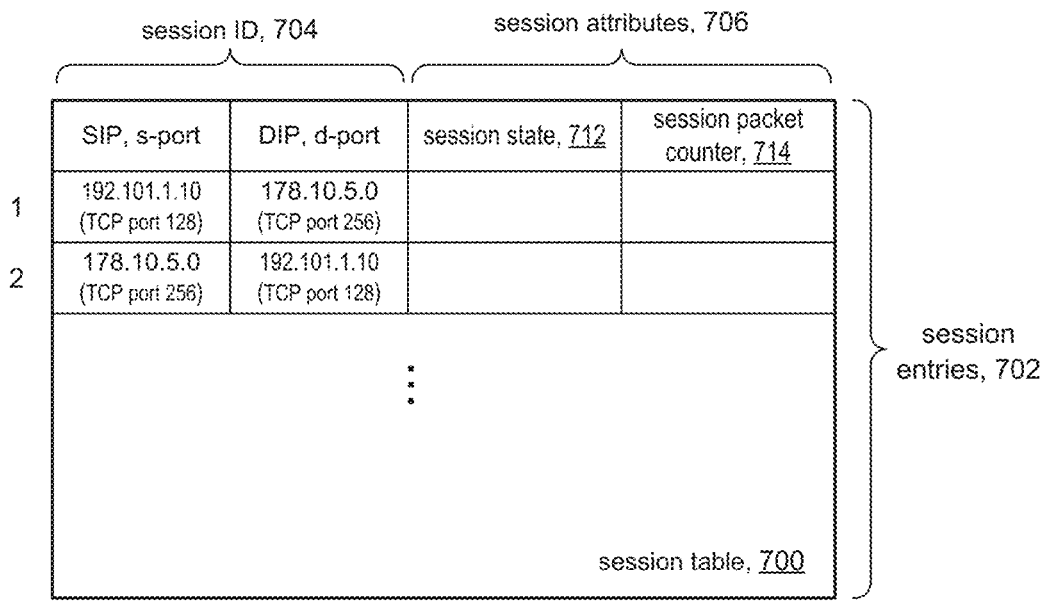
FIG. 7 shows a session table in accordance with some embodiments.

Referring first to FIG. 7, in some embodiments, the service node can include a session table to hold state information (session entries) for sessions detected in the mirrored traffic. In some embodiments, for example, session table 700 can hold session entries 702 for established sessions. Recall from FIG. 4, a session can be identified based on the IP and TCP port information contained in the IP and TCP packets contained in a packet. In some embodiments, a session entry can be identified (session ID 704) using the source and destination IP addresses and TCP ports in a packet. Referring to the example in FIG. 5, for instance, the session between Client A and Client B includes packets sent from A to B. Packets from A to B will contain the following IP/port addressing information:

SIP, s-port: 192.101.1.10, 128
DIP, d-port: 178.10.5.0, 256

Session table 700 can include a session entry (session entry 1) that is associated with this session. The session entry can be indexed or otherwise identified (session ID 704) using the above addressing information to identify packets in the A to B traffic flow.

A session includes traffic in both directions between two clients. Referring again to FIG. 5, the session between Client A and Client B also includes packets sent from B to A with the following IP/TCP port addressing information:

SIP, s-port: 178.10.5.0, 256
DIP, d-port: 192.101.1.10, 128

Accordingly, in some embodiments, the session can be associated with another session entry (session entry 2, FIG. 7) that can be indexed or otherwise accessed using the above addressing information to identify packets in the B to A traffic flow. In other embodiments (not shown), as an optimization, the source/destination IP and TCP port 4-tuple can be normalized by arranging for the source-IP-address/source-TCP-port pair to always be less than the destination-IP-address/destination-TCP-port pair. We then use the normalized 4-tuple for lookup, saving us from having to consume two session entries in the session entry table.

In accordance with some embodiments, session entries 702 can be created in response to the occurrence of a start-of-session packet in the data stream. Session table 700 includes session attributes 706 that describe aspects of a session. These aspects of session table 700 are discussed in further detail.

Figure 8:
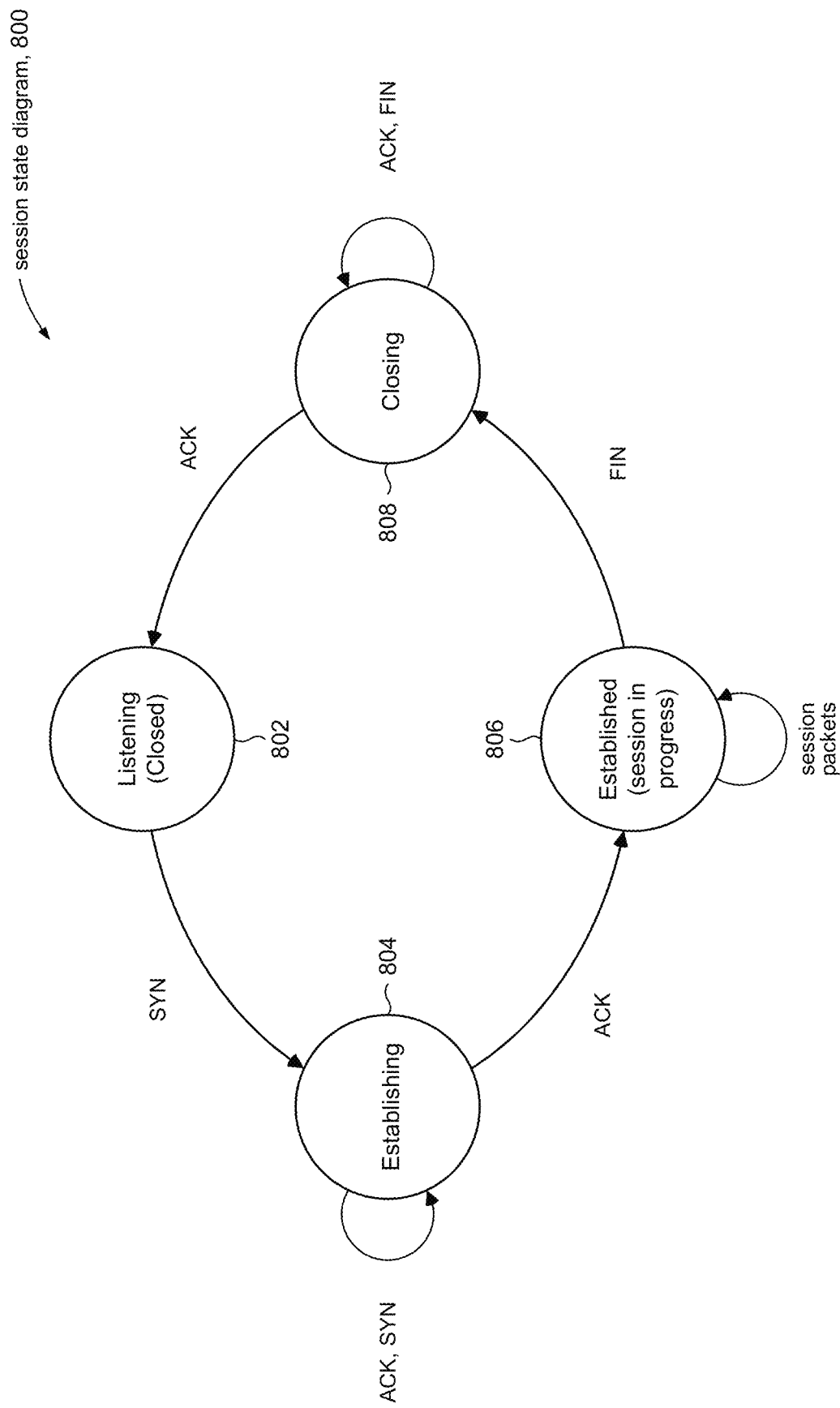
FIG. 8 is a simplified state diagram of a TCP session.

FIG. 8 shows a simplified state transition diagram 800 of the basic states of a TCP session for the purpose of describing aspects of processing sessions by a service node in accordance with the present disclosure. A more complete state transition diagram takes into account resets, timeouts, and other conditions that would unnecessarily complicate the description.

The service node is initially in the listening state 802, which represents the service node waiting to detect (listening for) a start-of-session packet in the packet stream of the mirrored traffic.

The service node transitions to the establishing state 804 when it sees a start-of-session packet in the packet stream. This is the first packet in the 3-way handshake for establishing a session, for example, as shown in FIG. 5.

The service node transitions to the established state 806 when it sees the final packet (ACK==1, SYN==0, FIN==0) of the 3-way handshake in the packet stream. At this time, the session is in progress. The service node remains in the established state until it detects an end-of-session packet in the packet stream.

The service node transitions to the closing state 808 when it sees an end-of-session packet (ACK==0, SYN==0, FIN==1) in the packet stream; e.g., see time index 4 in FIG. 5. The service node remains in the closing state 808 until it sees the final packet in the session termination sequence (e.g., at time index 7) after which the service node transitions back to the listening state 802.

Referring to FIG. 9, the discussion will now turn to a high level description of details for processing a session-related packet in a service node in accordance with the simplified state transition diagram in FIG. 8. In some embodiments, for example, the service node can include computer executable program code, which when executed by a processor (e.g., 1102, FIG. 11), can cause the service node to perform processing in accordance with FIG. 9.

FIG. 9 shows the basic operations for processing a TCP session in accordance with the present disclosure. A more complete set of operations takes into account resets, timeouts, and other conditions that would unnecessarily complicate the description.

Session entries 702 in session table 700 can be used to manage the processing of session-related packets and managing the sessions. A session entry can comprise session attributes 706, including:

session state (712)—Represents the state of a session as shown in FIG. 8, including ESTABLISHING, ESTABLISHED, CLOSING and excluding the LISTENING state. The LISTENING state is a state in which the service node is "listening" or otherwise waiting for the start-of-session packet to begin the session. The LISTENING state is a state prior to the existence of a session and so there is no session entry that has a session state of LISTENING.

session packet counter (714)—Represents the number of packets in the session, sent in one direction (e.g., from Client A to Client B).

other attributes (not shown)—A session entry can store the sequence number and acknowledgement number fields; e.g., to detect the start of and end of session packets.

Aspects of these attributes are described below.

At decision point 902, the service node can determine if it is in the LISTENING state (802, FIG. 8) with respect to the packet. The LISTENING state is a state in which the service node is "listening" or otherwise waiting for the start-of-session packet to begin the session. If the packet is a start-of-session packet, then the service node can be deemed to be in the LISTENING state with respect to the packet. Referencing FIG. 5, for example, the service node can look for the TCP flags: ACK==0, SYN==1, FIN==0 in the packet to detect a start-of-session packet. If the service node is in the LISTENING state with respect to the packet, then the service node can continue processing at operation 922. If the packet is not a start-of-session packet, the service node can be deemed to be not in the LISTENING state with respect to the packet and the service node can continue processing at decision point 904.

At decision point 904, the service node can determine if it is in the ESTABLISHING state (804, FIG. 8) with respect to the packet. Recall from decision point 604 in FIG. 6, that we arrive at FIG. 9 when a packet is deemed to be a session-related packet, either because it is a start-of-session packet (despite not being associated with a session entry) or because the packet is associated with a session entry. Accordingly, at this point in FIG. 9, the packet is associated with a session entry and the session state attribute 712 can be used to determine session state. If the session state attribute 712 indicates the ESTABLISHING state, then the service node can continue processing at decision point 932. If the session state attribute 712 in the session entry does not indicate the ESTABLISHING state, then the service node can continue processing at decision point 906.

At decision point 906, the service node can determine if it is in the ESTABLISHED state (806, FIG. 8) with respect to the packet. Using the session entry associated with the packet, for example, if the session state attribute 712 in the session entry indicates the ESTABLISHED state, then the service node can continue processing at decision point 942. If the session state attribute 712 in the session entry does not indicate the ESTABLISHED state, then the service node can continue processing at decision point 908.

At decision point 908, the service node can determine if it is in the CLOSING state (808, FIG. 8) with respect to the packet. Using the session entry associated with the packet, for example, if the session state attribute 712 in the session entry indicates the CLOSING state, then the service node can continue processing at decision point 962. If the session state attribute 712 in the session entry does not indicate the CLOSING state, then the service node can pass the packet back to the switch fabric (operation 912). Processing of the received packet in accordance with FIG. 9 can be deemed complete.

Pass Packet, Operation 912

At operation 912, the service node can pass the packet back to the switch fabric. Depending on how the switch fabric is configured, the packet can be forwarded to an appropriate monitoring tool. In some embodiments, the packet can also be forwarded to a packet recorder. Processing of the received packet in accordance with FIG. 9 can be deemed complete.

Drop Packet, Operation 914

As explained below, in accordance with the present disclosure packets that are not in the "session slice" can be dropped. This allows for the monitoring tool to capture important information that occurs at the beginning of a session (the session slice) but ignore packets during the session. Accordingly, at operation 914, the service node can drop the packet instead of passing it back to the switch fabric. In some embodiments, however, the packet can be passed back to the switch fabric in order for the packet to be forwarded to a packet recorder.

Transition: LISTENING State→ESTABLISHING State

The Y branch from decision point 902 to operation 922 corresponds to a transition from the LISTENING state to the ESTABLISHING state. In accordance with some embodiments, this transition can mark the beginning of a new session between the two clients identified in the packet.

At operation 922, the service node can create two session entries in session table 700. One session entry will track packets from one client to the other, and the other session entry will track packets in the reverse direction. Referring to the session example in FIG. 5, for instance, the session can be associated with the two session entries:

session entry 1:
SIP, s-port: 192.101.1.10, 128 (Client A)
DIP, d-port: 178.10.5.0, 256 (Client B)

session entry 2:
SIP, s-port: 178.10.5.0, 256 (Client B)
DIP, d-port: 192.101.1.10, 128 (Client A)

The service node can initialize the session attributes for each session entry, including setting the session state 712 to the ESTABLISHING state (operation 924). The session packet counters 714 in each session entry can be initialized at operation 926. Continuing with our example, the counter for session entry 1 can be set to '1', to indicate the service node has seen one packet so far, namely, the start-of-session packet from A to B. The counter for session entry 2 can be set to '0', to indicate the service node has not seen any packet for this session in the direction from B to A. The service node can pass the packet back to the switch fabric (operation 912). Processing of the received packet in accordance with FIG. 9 can be deemed complete.

Transition: ESTABLISHING State→ESTABLISHED State

At decision point 932, the service node can determine if the packet is the final packet in the 3-way handshake, for example, by looking for the TCP flags: ACK==1, SYN==0, FIN==0 and appropriate values in the sequence number and acknowledgement number fields in the packet. Such a packet indicates the end of the sequence for establishing the session and so marks the end of the ESTABLISHING state. If the packet is the final packet in the 3-way handshake, this corresponds to a transition from the ESTABLISHING state to the ESTABLISHED state. The service node can set the session state 712 to the ESTABLISHED state (operation 934) and continue processing at operation 936. If the packet is not the final packet in the 3-way handshake, then the service node can continue processing at operation 936.

At operation 936, the service node can update the session packet counter attribute in the session entry associated with the packet. In some embodiments, the source and destination IP addresses and TCP ports can be used to identify the session entry associated with the session that corresponds to the direction of the packet. Continuing with our example, for instance, if the packet is from A to B, then the session packet counter attribute in session entry 1 will be incremented by one, and if the packet is from B to A, then the counter in session entry 2 will be incremented by one. The service node can pass the packet back to the switch fabric (operation 912). Processing of the received packet in accordance with FIG. 9 can be deemed complete.

Session Slicing

At this point, the session is deemed to be established (ESTABLISHED state). The service node can remain in this state until the end-of-session packet is encountered.

At decision point 942, the service node can determine if the packet is an end-of-session packet. For example, the service node can look for the TCP flags: ACK==0, SYN==0, FIN==1 in the packet. If the packet is not an end-of-session packet, then this is an intra-session packet and the service node can remain in the ESTABLISHED state and process the intra-session packet at operation 944. If the packet is an end-of-session packet, then the service node can continue processing at operation 952.

At operation 944, the service node can update the counter attribute in the session entry associated with the intra-session packet. As noted above, the source and destination IP addresses and TCP ports can be used to identify the session entry associated with the session that corresponds to the direction of the packet. Using our example above, for instance, if the packet is from A to B, then the counter in session entry 1 can be incremented to update the number of packets transmitted from A to B for this session. Likewise, if the packet is from B to A, then the counter in session entry 2 will be incremented to update the number of packets transmitted from B to A for this session.

At decision point 946, the service node can determine whether to pass the packet or drop the packet. In accordance with the present disclosure, the service node can pass a user-configurable number of packets that constitute the beginning portion of a newly established session. More specifically, the service node can pass the first N packets beginning with the start-of-session packet. These packets can be described as being "interesting" or "important" because packets at the beginning of a session typically include information relating to setting up and verifying a session; e.g., TCP connection establishment information, security handshake sequences, exchange of certificates, and the like. The passing (capturing) of packets at the beginning of a session can be referred to as "session slicing" and the packets that are passed back to the switch fabric can be collectively referred to as a session slice.

Unlike current solutions such as packet slicing, packet sampling, rate limiting, and the like, the packets captured by session slicing in accordance with the present disclosure can provide a more complete view of a session. Packet slicing, for example, captures portions of each packet (e.g., first 128 bytes); the captured information is incomplete and potentially omits important information. Packet sampling (e.g., capturing every $n^{th}$ packet) effectively results in a random selection of packets from the stream. The frame rate of the traffic typically varies over time. When the frame rate reaches an upper limit, packets are simply dropped (rate limited). These conventional techniques provide an incomplete picture of a communication session between two clients.

By comparison, capturing the sequence of packets that constitute the beginning of a communication session can provide the network monitoring tools with a complete picture of the information used to set up and authenticate the session (connection). The beginning sequence of a session can include on the order of several tens of packets, so there is little to no risk of exceeding the bandwidth capacity of the monitoring tool, and hence no need for partial packet capture techniques such as packet slicing or packet sampling.

Continuing with decision point 946, in accordance with some embodiments, the service node can determine whether or not to pass the packet using the session packet counter attribute 714 in the session entry associated with the session that corresponds to the direction of the packet. Using our example above, for instance, if the packet is from A to B, then the determination will be based on the session packet counter in session entry 1, and if the packet is from B to A, then the counter in session entry 2 will be used.

If the number of packets sent is less than a user-defined value, $N_{packets}$, then the service node can pass the packet back to the switch fabric (operation 912). The switch fabric can then forward the packet to one or more monitoring tools. The user-defined value, $N_{packets}$, sets the size of the session slice; e.g., the number of packets in the session slice. If the number of packets sent exceeds the user-defined slice size then the service node can drop the packet (operation 914). Processing of the received packet in accordance with FIG. 9 can be deemed complete.

In some embodiments, a session slice can be only packets transmitted at the beginning of a session from Client A to Client B. In other embodiments, a session slice can be only packets transmitted at the beginning of a session from B to A. In still other embodiments, a session slice can include packets transmitted at the beginning of a session in both directions, from A to B and from B to A.

Transition: ESTABLISHED State→CLOSING State

The Y branch from decision point 942 to decision point 952 corresponds to a transition from the ESTABLISHED state to the CLOSING state.

At operation 952, the service node can set the session state 712 in both session entries that are associated with this session to the CLOSING state. The appropriate session packet counter can be incremented (operation 956) to update the number of packets sent. The service node can pass the packet back to the switch fabric (operation 912). Processing of the received packet in accordance with FIG. 9 can be deemed complete.

Transition: CLOSING State→LISTENING State

At decision point 962, the service node can determine if the packet is the final packet in the session closing sequence. For example, the service node can look for the TCP flags: ACK==1, SYN==0, FIN==0 and appropriate values in the sequence number and acknowledgment number fields in the packet. If the packet is not the final packet in the session closing sequence, then the service node can pass the packet back to the switch fabric (operation 912). Processing of the received packet in accordance with FIG. 9 can be deemed complete.

If the packet is the final packet in the session closing sequence, then the service node can set the session state to the LISTENING state (operation 954) and delete the two session entries associated with the session. The service node can pass the packet back to the switch fabric (operation 912). Processing of the received packet in accordance with FIG. 9 can be deemed complete.

The descriptions above use the TCP session as an illustrative example to explain the operations in a service node in accordance with some embodiments. It will be appreciated that "sessions" in accordance with the present disclosure can include any detectable sequence of protocols. For example, a DNS sequence can be deemed to be a "session" in the context of the present disclosure. Likewise, a DHCP sequence can be deemed to be a session, and so on. These sessions may not have a defined termination sequence. Instead, when a DNS session is detected, the service node can simply collect the next N packets and begin looking for the next session.

Figure 10:
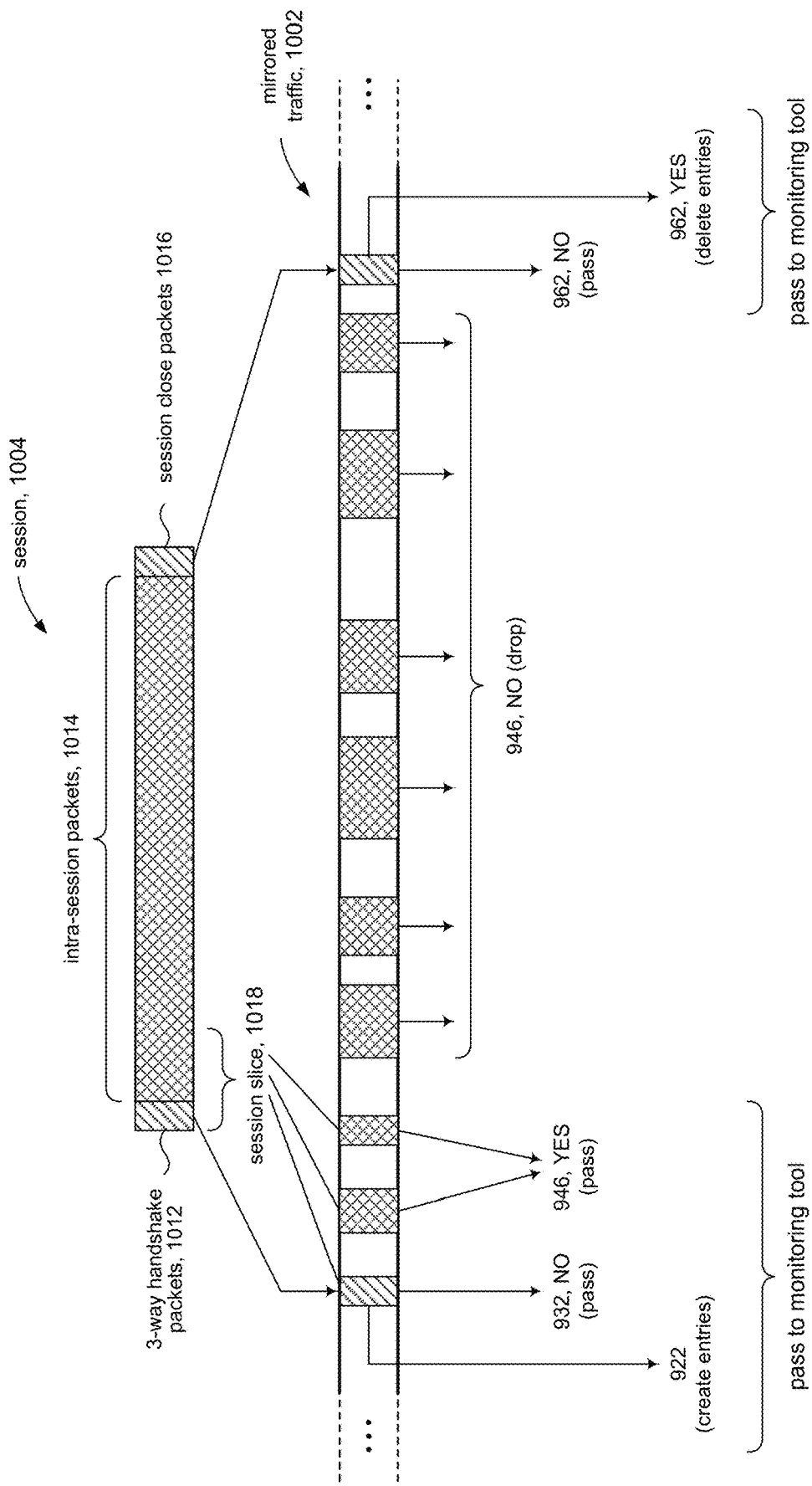
FIG. 10 illustrates processing in FIG. 9.

FIG. 10 illustrates the processing described in FIG. 9 with an example. Mirrored traffic 1002 represents a stream of data captured by a data tap between two network devices in a production fabric. The mirrored traffic includes packets from a TCP session 1004. Session 1004 includes packets 1012 that constitute the 3-way handshake that begin the session, the intra-session packets 1014, and the sequence of packets 1016 that close the session. FIG. 10 shows that the packets of session 1004 occur in mirrored traffic 1002 interleaved or otherwise interspersed with other packets in the data stream. Although the 3-way handshake packets 1012 occur in the mirrored traffic 1002 as a contiguous stream, it will be appreciated that the handshake packets can be interleaved with other packets in the data stream; likewise with the session close packets 1016.

The start-of-session packet triggers the creation of session entries (operation 922) for session 1004. FIG. 10 shows that session slice 1018 comprises a contiguous sequence handshake packets 1012 and some number of intra-session packets following the handshake packets in session 1004. The session slice packets are identified at decision points 932 (NO branch) and 946 (YES branch) and passed on to a monitoring tool. The remaining intra-session packets are detected at decision point 946 (NO branch) and dropped. The session close packets 1016 are detected at decision point 962 and passed on to the monitoring tool. The last packet in the session close packets 1016 triggers the deletion of the session entries for session 1004.

Figure 11:
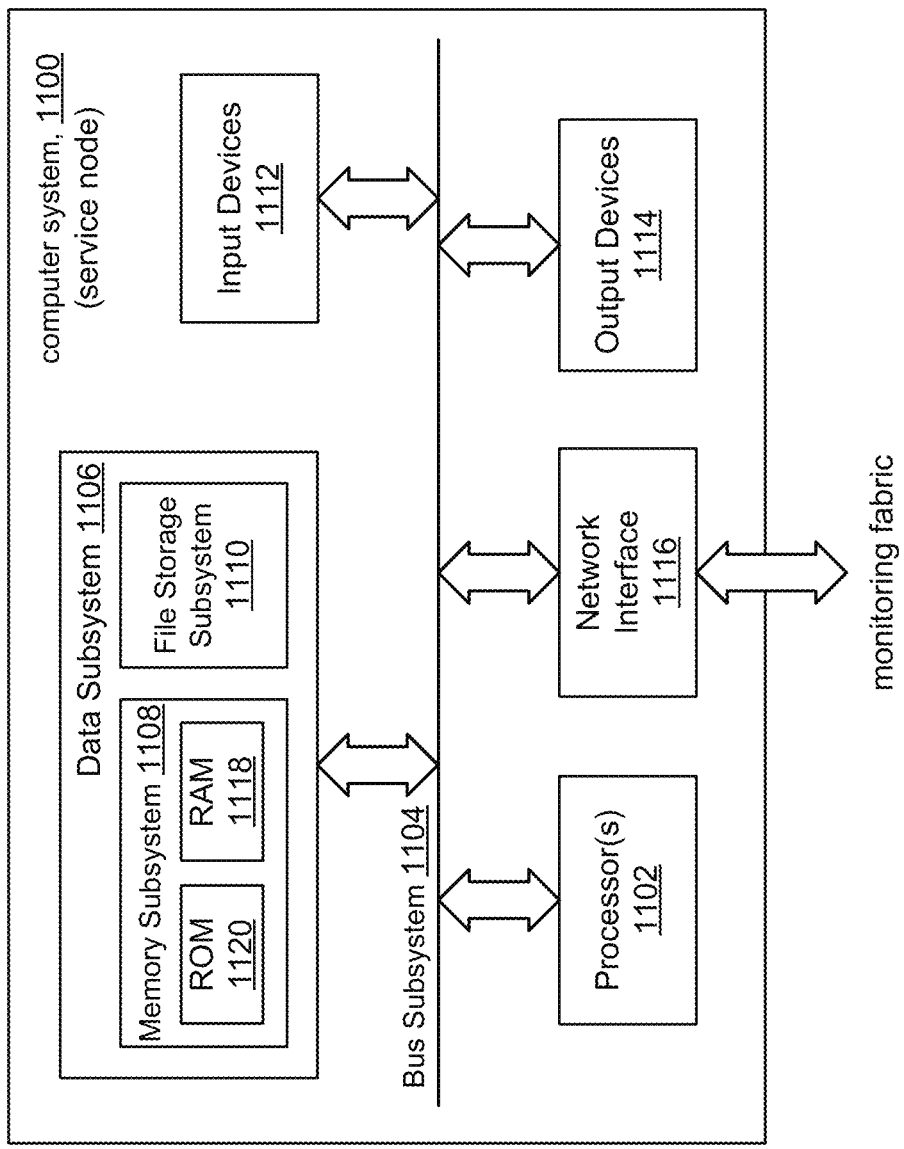
FIG. 11 shows an illustrative computing system adapted in accordance with the present disclosure.

FIG. 11 depicts a simplified block diagram of an example computer system 1100 according to certain embodiments. Computer system 1100 can be used to implement a service node in accordance with the present disclosure. As shown in FIG. 11, computer system 1100 includes one or more processors 1102 that communicate with a number of peripheral devices via bus subsystem 1104. These peripheral devices include data subsystem 1106 (comprising memory subsystem 1108 and file storage subsystem 1110), user interface input devices 1112, user interface output devices 1114, and network interface subsystem 1116.

Bus subsystem 1104 can provide a mechanism that enables the various components and subsystems of computer system 1100 to communicate with each other as intended. Although bus subsystem 1104 is shown schematically as a single bus, alternative embodiments of the bus subsystem can utilize multiple busses.

Network interface subsystem 1116 can serve as an interface for communicating data between computer system 1100 and other devices (e.g., a switch in monitoring fabric 212). Embodiments of network interface subsystem 1116 can include, e.g., an Ethernet card.

User interface input devices 1112 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1100.

User interface output devices 1114 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1100.

Data subsystem 1106 includes memory subsystem 1108 and file/disk storage subsystem 1110 represent non-transitory computer-readable storage media that can store program code and/or data, which when executed by processor 1102, can cause processor 1102 to perform operations in accordance with embodiments of the present disclosure.

Memory subsystem 1108 includes a number of memories including main random access memory (RAM) 1118 for storage of instructions and data during program execution and read-only memory (ROM) 1120 in which fixed instructions are stored. File storage subsystem 1110 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1100 is illustrative and many other configurations having more or fewer components than system 1100 are possible.

FURTHER EXAMPLES

In accordance with the present disclosure, a method in a service node in a monitoring fabric includes: receiving mirrored traffic generated in a production fabric separate from the monitoring fabric; identifying a begin packet among the mirrored traffic based on data contained in packets in the mirrored traffic, the begin packet indicative of a start of a communication session between a first client and a second client; identifying session packets among the mirrored traffic that belong to the communication session between the first and second clients; forwarding a first plurality of session packets comprising session packets from the start of the session to a switch in the monitoring fabric; and dropping a second plurality of session packets subsequent to the first plurality of session packets.

In some embodiments, the first plurality of session packets are forwarded to a security tool, wherein the second plurality of session packets are not forwarded to the security tool and are forwarded to a packet recorder.

In some embodiments, the first plurality of session packets comprises the begin packet and one or more session packets subsequent to the begin packet.

In some embodiments, the method further includes identifying an end packet among the session packets, the end packet indicative of termination of the session; and forwarding a third plurality of session packets comprising the end packet and one or more packets subsequent to the end packet to the switch in the monitoring fabric. In some embodiments, the packets between the first plurality of session packets and the third plurality of session packets are dropped.

In some embodiments, the session is a transport control protocol (TCP) session.

In some embodiments, the first plurality of session packets comprise only session packets sent from the first client to the second client.

In some embodiments, the first plurality of session packets comprise session packets sent from the first client to the second client and session packets sent from the second client to the first client.

In accordance with the present disclosure, a packet processing device in a monitoring fabric includes: one or more computer processors; and a computer-readable storage medium comprising instructions for controlling the one or more computer processors to: receive mirrored traffic captured by a data tap, the mirrored traffic comprising traffic flow between two network devices in a production fabric separate from the monitoring fabric; identify in the mirrored traffic a beginning portion of a session between a first client and a second client; cause the beginning portion of the session to be forwarded to a monitoring tool; and cause a middle portion of the session subsequent to the beginning portion to be omitted from the monitoring tool.

In some embodiments, the beginning portion of the session comprises a start-of-session packet and a plurality of packets following the start-of-session packet.

In some embodiments, the beginning portion of the session is forwarded to a switch in the monitoring fabric, wherein the switch forwards the beginning portion of the session to a monitoring tool.

In some embodiments, the computer-readable storage medium further comprises instructions for controlling the one or more computer processors to forward the middle portion of the session to a packet recording device.

In some embodiments, the computer-readable storage medium further comprises instructions for controlling the one or more computer processors to: identify an end portion of the session between the first client and the second client; and cause the end portion of the session to be forwarded to the monitoring tool.

In some embodiments, the beginning portion of the session comprises only packets sent from the first client to the second client.

In some embodiments, the beginning portion of the session comprises packets sent from the first client to the second client and packets sent from the second client to the first client.

In some embodiments, the session is a TCP session.

In accordance with the present disclosure, a method includes: receiving mirrored traffic generated by mirroring traffic between a first network device and a second network device; identifying session packets that belong to a communication session between a first client and a second client, wherein a data path between the first and second clients includes the first and second network devices; capturing a first plurality of the session packets that represent a beginning portion of the communication session; and dropping a second plurality of the session packets subsequent to the first plurality of session packets.

In some embodiments, capturing the first plurality of the session packets includes forwarding the first plurality of the session packets to a switch, wherein the switch forwards the first plurality of the session packets to a monitoring tool.

In some embodiments, dropping the second plurality of the session packets includes: marking the second plurality of the session packets; and forwarding the marked second plurality of the session packets to the switch, wherein the switch forwards the marked second plurality of session packets to a packet recorder.

In some embodiments, the method further includes: identifying an end packet among the session packets, the end packet indicative of termination of the session; and capturing a third plurality of session packets comprising the end packet and one or more packets subsequent to the end packet.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a service node in a monitoring fabric, the method comprising:
   receiving mirrored traffic captured by a data tap that is a copy of traffic flowing in a production fabric separate from the monitoring fabric;
   identifying a begin packet among the mirrored traffic based on data contained in packets in the mirrored traffic, the begin packet indicative of a start of a communication session between a first client and a second client;
   identifying session packets among the mirrored traffic that belong to the communication session between the first and second clients, wherein the session packets comprise a first plurality of session packets, a second plurality of session packets, and a third plurality of session packets;
   forwarding the first plurality of session packets comprising session packets from the start of the session to a switch in the monitoring fabric; and
   dropping the second plurality of session packets comprising one or more of the session packets subsequent to the first plurality of session packets.

2. The method of claim 1, wherein the first plurality of session packets are forwarded to a network monitoring device, wherein the second plurality of session packets are not forwarded to the security tool and are forwarded to a packet recorder.

3. The method of claim 1, wherein the first plurality of session packets comprises the begin packet and one or more session packets subsequent to the begin packet.

4. The method of claim 1, further comprising:
   identifying an end packet among the session packets, the end packet indicative of termination of the session; and
   forwarding the third plurality of session packets comprising one or more packets subsequent to the second plurality of the session packets and including the end packet and one or more packets subsequent to the end packet to the switch in the monitoring fabric.

5. The method of claim 4, wherein the packets between the first plurality of session packets and the third plurality of session packets are dropped.

6. The method of claim 1, wherein the session is a transmission control protocol (TCP) session.

7. The method of claim 1, wherein the first plurality of session packets comprise only session packets sent from the first client to the second client.

8. The method of claim 1, wherein the first plurality of session packets comprise session packets sent from the first client to the second client and session packets sent from the second client to the first client.

9. A packet processing device in a monitoring fabric, the packet processing device comprising:
   one or more computer processors; and
   a computer-readable storage medium comprising instructions for controlling the one or more computer processors to:
   receive mirrored traffic captured by a data tap, the mirrored traffic comprising a copy of traffic flow between two network devices in a production fabric separate from the monitoring fabric;

identify in the mirrored traffic a beginning portion of a communication session (session), a middle portion of the session, and an end portion of the session between a first client and a second client;

cause the beginning portion of the session to be forwarded to a network traffic monitoring device;

cause the middle portion of the session comprising a plurality of packets subsequent to a plurality of packets of the beginning portion to be omitted from the network traffic monitoring device; and forward the middle portion of the session to a packet recorder.

10. The packet processing device of claim 9, wherein the beginning portion of the session comprises a start-of-session packet and a plurality of packets following the start-of-session packet.

11. The packet processing device of claim 9, wherein the beginning portion of the session is forwarded to a switch in the monitoring fabric, wherein the switch forwards the beginning portion of the session to the network traffic monitoring device.

12. The packet processing device of claim 9, wherein the computer-readable storage medium further comprises instructions for controlling the one or more computer processors to forward the middle portion of the session to a packet recording device.

13. The packet processing device of claim 9, wherein the computer-readable storage medium further comprises instructions for controlling the one or more computer processors to:

identify an end portion of the session between the first client and the second client; and cause the end portion of the session to be forwarded to the monitoring tool.

14. The packet processing device of claim 9, wherein the beginning portion of the session comprises only packets sent from the first client to the second client.

15. The packet processing device of claim 9, wherein the beginning portion of the session comprises packets sent from the first client to the second client and packets sent from the second client to the first client.

16. The packet processing device of claim 9, wherein the session is a Transmission Control Protocol (TCP) session.

17. A non-transitory computer-readable storage device in a network device, the non-transitory computer-readable storage device having stored thereon computer executable instructions, which when executed, cause the network device to:

receive mirrored traffic captured by a data tap that is a copy of traffic flowing in a production fabric separate from the monitoring fabric;

identify a begin packet among the mirrored traffic based on data contained in packets in the mirrored traffic, the begin packet indicative of a start of a communication session between a first client and a second client;

identify session packets among the mirrored traffic that belong to the communication session between the first and second clients, wherein the session packets comprise a first plurality of session packets, a second plurality of session packets, and a third plurality of session packets;

forward the first plurality of session packets comprising session packets from the start of the session to a switch in the monitoring fabric; and drop the second plurality of session packets comprising one or more of the session packets subsequent to the first plurality of session packets.

18. The non-transitory computer-readable storage device of claim 17, wherein the first plurality of session packets are forwarded to a network monitoring device, wherein the second plurality of session packets are not forwarded to the security tool and are forwarded to a packet recorder.

19. The non-transitory computer-readable storage device of claim 17, wherein the first plurality of session packets comprises the begin packet and one or more session packets subsequent to the begin packet.

20. The non-transitory computer-readable storage device of claim 17, wherein the first plurality of session packets comprise only session packets sent from the first client to the second client.

* * * * *